United States Patent [19]

Letourneau

[11] Patent Number: 5,504,688

[45] Date of Patent: Apr. 2, 1996

[54] COMPACT DISC MARKING METHOD AND APPARATUS

[76] Inventor: John C. Letourneau, 37 Hawley Rd., No. 105, Fairfax, Vt. 05454

[21] Appl. No.: 305,825

[22] Filed: Sep. 14, 1994

[51] Int. Cl.$^6$ .................................................. G06F 19/00
[52] U.S. Cl. ........................... 364/478; 101/4; 364/479
[58] Field of Search .................................. 364/468, 478,
364/429, 401–403, 405; 206/307–313, 15,
459.5, 224; 101/3.1, 4, DIG. 30, DIG. 47;
400/127–131, 30; 347/110

[56] References Cited

U.S. PATENT DOCUMENTS

| | | | |
|---|---|---|---|
| 3,867,882 | 2/1975 | Ahlgren et al. | 101/35 |
| 3,960,072 | 6/1976 | Ahlgren et al. | 101/35 |
| 4,578,329 | 3/1986 | Holsappel | 430/18 |
| 5,056,029 | 10/1991 | Cannon | 364/468 |
| 5,090,561 | 2/1992 | Spector | 206/313 |
| 5,206,814 | 4/1993 | Cahlander et al. | 364/479 |
| 5,313,881 | 5/1994 | Morgan | 101/4 |
| 5,320,219 | 6/1994 | Ward | 206/224 |
| 5,427,029 | 6/1995 | Dumke | 101/484 |

*Primary Examiner*—Joseph Ruggiero
*Attorney, Agent, or Firm*—Richard C. Litman

[57] ABSTRACT

A device and method for engraving a compact disc. The device accepts the compact disc from a person, and transports the compact disc to a work station. After the user makes payment, as by insertion of coins, debit card, or the like, and the device recognizes and accepts the payment, the user programs the device with data corresponding to desired indicia. The data is transmitted to an orthogonal controller which guides and operates a rotating blade to mark the compact disc according to the programmed data. The compact disc is thus marked, then returned to the user. A dispenser for dispensing a label attachable to the compact disc case or any part thereof is optionally provided integrally to the device. The device finds application in a publicly available machine for marking compact discs with a permanent inscription indicating ownership, celebrating an event of personal importance, or like expression on the part of the user.

20 Claims, 3 Drawing Sheets

COMPACT DISC MARKING METHOD AND APPARATUS

BACKGROUND OF THE INVENTION

1. Field of the Invention

The present invention relates to a method of permanently marking indicia upon a compact disc, and to apparatus for accomplishing the method.

2. Description of the Piror Art

Compact discs have recently come into widespread use as a medium for recording video and audio data for subsequent reproduction. As these discs are small, light, and highly practical, it has also become widespread to lend and transport them. Accordingly, the opportunities for loss by theft, forgetfulness, and the like have increased.

Providing identifying markings on compact discs has been proposed in the prior art. U.S. Pat. No. 5,320,219, issued to David Ward on Jun. 14, 1994, discloses a kit for stamping indicia upon individual compact discs. The inscription is dependent upon the preformed stamp. No change to the selected indicia is possible without a new stamp. Also, this invention deposits ink on the surface of the compact disc which penetrates the disc, but does not distort the same. It would be possible for a person so motivated to alter the indicia by repeating the ink deposition step.

U.S. Pat. No. 5,090,561, issued to Donald Spector on Feb. 25, 1992, discloses a compact disc having indicia printed upon the unrecorded face.

A method of marking a synthetic polymeric substrate is illustrated in U.S. Pat. No. 4,578,329, issued to Albert Holsappel on Mar. 25, 1986. A laser beam is projected onto the substrate, and reacts with a radiation absorbing substance. Local decomposition of the substrate ensues, turning the substrate black. This patent describes a process which can be employed to form indicia upon the surface of a particular material similar to that of compact discs, but does not shed light on methods of controlling and selecting the indicia.

A machine having a programmable controller suitable for custom printing is disclosed in U.S. Pat. No. 5,056,029, issued to Thomas G. Cannon on Oct. 8, 1991. This patent describes certain facets of technology which could be adapted for use in the present invention. However, the present invention does not concern a printing process, and requires an additional degree of control compared to printing processes.

None of the above inventions and patents, taken either singly or in combination, is seen to describe the instant invention as claimed.

SUMMARY OF THE INVENTION

The present invention provides a machine which will provide convenient marking services to the public for marking compact discs. The machine requires payment, as by insertion of paper currency, coins or by credit or debit card or the like. The compact disc is inserted into the machine, marked, and returned to the owner.

This process enables an owner of a compact disc to mark any desired message or pictorial depiction upon the clear unrecorded portion on the front face of a compact disc. Typically, an owner will want to enter his or her name or other identifying information on the disc. Other messages may include a personalized inscription if the disc is to be a gift, or a holiday greeting, a commercial, religious, or political message. The owner is free to select any message within the mechanical limits of what is possible to engrave given the constraints of the machine and the available space of the compact disc. To accomplish this purpose, the machine is programmed to mark letters, symbols, and even preprogrammed pictorial indicia as selected by the user.

While the present discussion refers to engraving, any suitable permanent marking method will serve the purposes of the invention. Thus, preferred routing, hot stamping, high voltage, high pressure fluid jets, and laser methods may be substituted for the engraving process described in greater detail hereinafter. Of course, since the surface of the disc is affected, the area which is available for marking is limited to areas not read by the laser.

Similarly, while it is contemplated that the invention will find its widest application with audio or video compact discs, any disc made from a synthetic polymer bearing data, such as a CD ROM, is encompassed within the term "compact disc".

The preferred marking method employs a router located upon a traveling carrier. The carrier moves along two axes of a plane arranged generally parallel to the surface of the compact disc. A rotary blade projects toward the compact disc, and is adjustable along its access so as to contact and penetrate the compact disc.

The novel machine combines the movable router, a microprocessor, a data input and confirmation device, a value acceptor, and a disc transport and positioning apparatus. The value acceptor may comprise paper currency and coin handling equipment commonly employed in vending machines.. Alternatively, a card reader may be employed to read a credit or debit card. The value acceptor inhibits or initiates machine operation.

The data input and confirmation device preferably includes a keyboard and the screen of a liquid crystal display, or even a cathode ray tube. Commands are entered by the keyboard and transmitted to the microprocessor, and feedback is provided by messages and pictorial depictions visible on the screen. The commands may be modified as desired in light of the feedback displayed upon the screen. When the inscription is ready for execution, a command is transmitted to the microprocessor, and the engraving process is automatically performed.

A traveling disc holder accepts the compact disc as it is inserted into the machine, and transports the disc to a work station. After the engraving process is complete, the disc holder returns the disc to its owner.

Control of the carrier and router employ known technology. This technology has been proven in applications including ink plotters, plasma cutters, printers, and other programmable devices.

Similarly, entering data corresponding to desired indicia also employs known technology, the patent to Cannon being representative of this technology.

Successful operation of the machine is best provided by a microprocessor. The microprocessor includes memory for temporary and permanent retention of commands for operating the inscription device, and a repertoire of available indicia and instructions to a user.

Accurate reproduction of the desired inscription, reliable depth control of the cutting blade, initiation of operation, and other aspects of machine operation are best provided under the control of a microprocessor. It is most feasible to automate the machine and integrate various aspects of operation by employing a programmable controller or microprocessor.

Accordingly, it is a principal object of the invention to provide an apparatus for marking a compact disc permanently.

It is another object of the invention to enable an owner of a compact disc to personalize the inscription by selecting a desired message for subsequent inscription upon the compact disc.

It is a further object of the invention to enable the apparatus to operate responsive to payment.

A further object of the invention is to operate the novel apparatus under the control of a microprocessor.

Still another object of the invention is to enable a user to input data corresponding to selected indicia to the apparatus for marking a compact disc.

An additional object of the invention is to provide feedback for ascertaining correctness and appearance of the selected indicia prior to inscription.

It is again an object of the invention to employ a device which selectively moves a marking device in three axes so as to interact effectively with the flat surface of a compact disc being marked in the clear unrecorded portion on the front face.

Yet another object of the invention is to mark a compact disc by affecting the surface of a compact disc by projection of energy brought to bear upon this surface.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
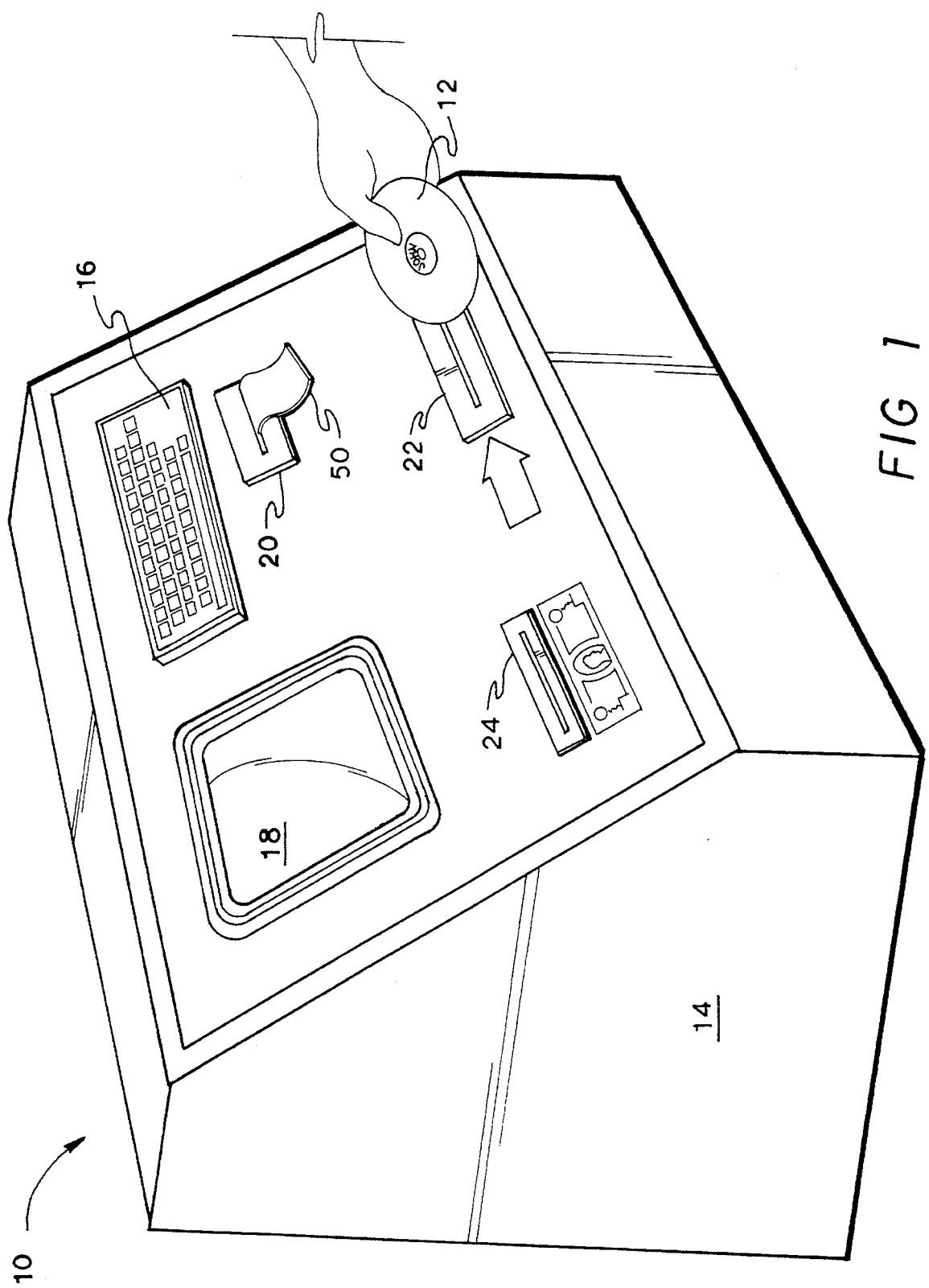
FIG. 1 is an environmental perspective view of a machine incorporating the present invention.

Turning now to FIG. 1 of the drawings, novel disc marking apparatus 10 is a machine for marking indicia upon the flat surface in the clear unrecorded portion on the front face of a compact disc 12 made from a synthetic polymer. The machine is intended for use by the general public, and has a housing 14 on which are mounted those components which require user involvement.

Disposed upon the front of housing 14 are a keypad 16, a screen 18, an optional sticker dispenser 20, a slot 22 for insertion of a compact disc 12, and a payment acceptor 24 or the like. Payment acceptor 24 activates apparatus 10 responsive to successful recognition and acceptance of payment. Payment acceptor 24 accepts coins, paper currency, and electronically encoded payment devices such as credit and debit cards.

To operate the machine, the user makes payment and inserts compact disc 12 into slot 22. Instructions for use appear upon screen 18, and the user responds by depressing appropriate keys on keypad 16. Keypad 16 enables manual data entry by the user to input corresponding data to apparatus 10. Screen 18 displays both instructions and a depiction of a compact disc showing selected indicia.

Figure 2:
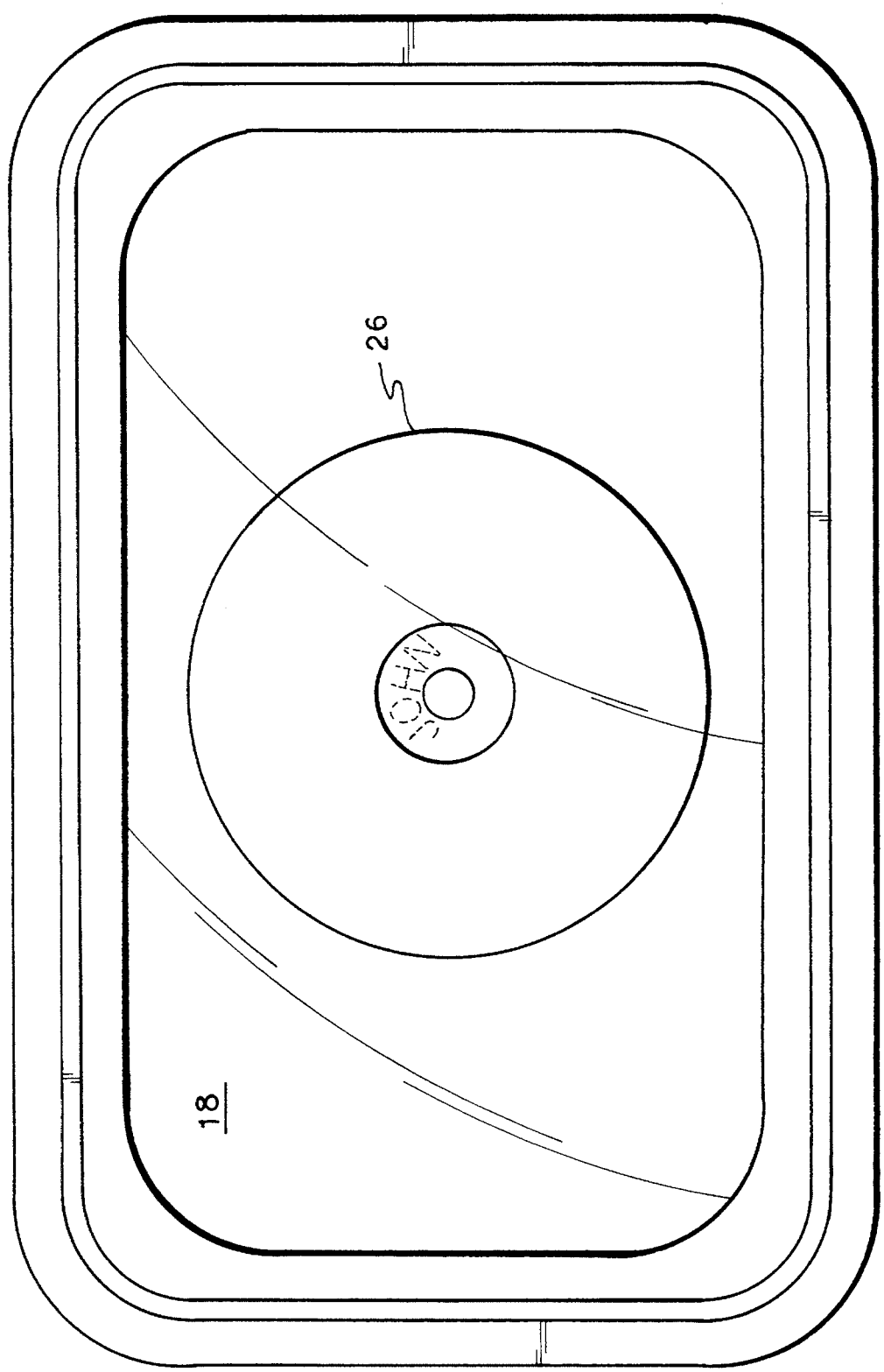
FIG. 2 is a detail front view showing a representative depiction of the subject matter shown on the viewing screen shown at the top left of the depiction of FIG. 1, drawn to enlarged scale.

An example is seen in FIG. 2, wherein the man's name "John" is selected, and superimposed over the image 26, shown in silhouette, of a compact disc. Obviously, apparatus 10 can be programmed to vary lettering size, font, configuration of a written line, and still other characteristics of the inscription. It may be programmed to mark any letters, symbols, and pictorial depictions, such as animals, flags, and other frequently selected subjects. The combination of these elements may be arranged according to the abilities programmed into apparatus 10.

When a desired inscription is finalized, the user gives a command by the appropriate key to execute the design. Apparatus 10 then automatically marks compact disc 12. Apparatus 10 then returns compact disc 10 by transporting and partially ejecting the same from apparatus 10.

Figure 3:
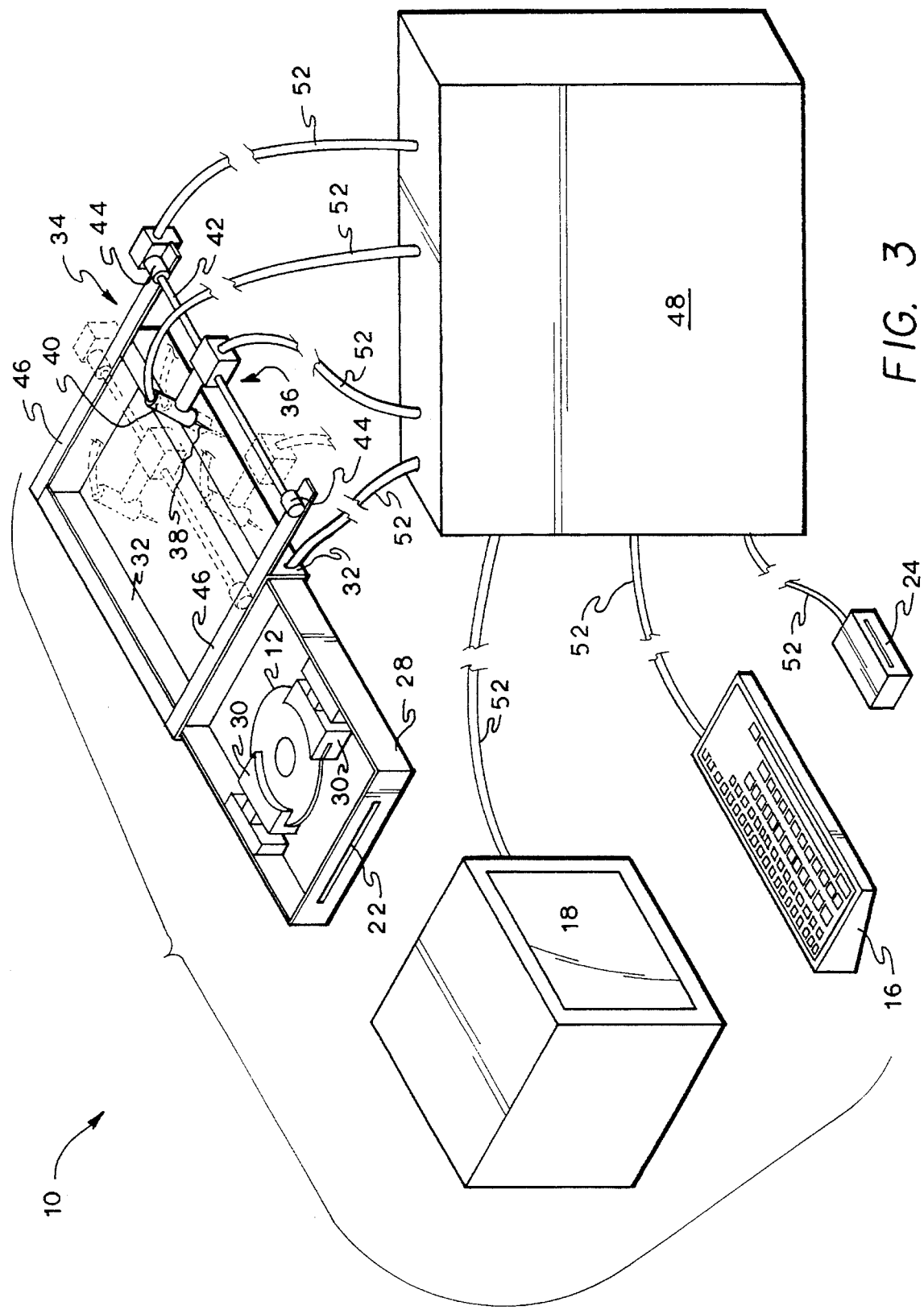
FIG. 3 is a diagrammatic, perspective view of the major components of the novel machine.

Automatic operation of apparatus 10 is described with reference to FIG. 3. When compact disc 12 is inserted by the user into slot 22, it is received by a carrier 28 having two jaws 30. Carrier 28 accepts compact disc 12 after activation by clamping compact disc 12 between jaws 30. Carrier 28 slides on tracks 32 to a work station, or a predetermined, fixed location. After inscription is completed, carrier 28 reverses transport and positioning of compact disc 12, and returns disc 12 to a location accessible to the user.

The work station is proximate a marking apparatus 34, which is any apparatus capable of selectively projecting energy onto the surface of compact disc 12. Projected energy may take many forms, such as pressure, heat, light, laser light, vibration, electrical discharge, ion discharge, sonic energy, or any other form of energy which can be sufficiently focussed or controlled to distort the surface of a compact disc in a controlled manner. The energy is brought to bear only upon the surface of the disc, the effect penetrating partially into the thickness of the polymeric material, but not sufficiently deep to distort the other side of the disc. The effect of this distortion is to create a visually distinct permanent marking suitable for reproducing letters, symbols, and other selected indicia.

In a preferred embodiment, marking apparatus 34 comprises a working head 36 including a rotary drilling or boring blade 38, a motor 40 for rotating blade 38, and apparatus for moving or adjusting blade 38 axially, so as to engage and penetrate the surface of compact disc 12. The depth of penetration is automatically controlled to engrave the surface of compact disc 12 satisfactorily.

Working head 36 rides along a shaft 42, moving right and left along shaft 42. Shaft 42 is supported in turn upon rollers 44, which can roll along a track 46 forwardly and backwardly, in directions normal to the motion of working head 36 as it moves on shaft 42. This combination of orthogonal directions, when appropriately controlled in well known fashion, enables blade 38 to describe any path, and to engrave any desired indicia into the surface of compact disc 12.

Inscribed lines are discontinued by withdrawing working head 36, and thus blade 38, from engagement with the surface of compact disc 12. This is accomplished by any suitable linear motor or the like, contained within working head 36. Devices for moving blade 36 and for causing the working head to travel along shaft 42 in an xyz axis fashion are well known, and will not be described in further detail herein. Exemplary alternative positions of these components as they move along the "x" and "y" axes are shown in broken lines. In this Figure, blade 38 is caused to move vertically. This motion is normal to the "x" and "y" axes, and thus provides the "z" axis.

Appropriate commands for accomplishing the above control scheme are generated by a microprocessor 48. Microprocessor 48 accepts data input in regard to selected indicia, location of the indicia, and similar characteristics to the final appearance of the marked disc from keypad 16, and transmits corresponding commands to components moving carrier 28, jaws 30, working head 36, blade 38, and rollers 44.

Keypad 16 provides a data input device for accepting data corresponding to selected indicia, and communicating this data to microprocessor 48. Other types of data input devices may be incorporated into the invention. For example, a touch type screen (not shown) which is operated by pressing on the surface with a user's finger, stylus or the like, or a sound responsive device (not shown) may be substituted for a key pad.

The selected indicia and preprogrammed instructions are displayed on screen 18 of a liquid crystal display, a cathode ray tube, or any other suitable display. Screen 18 not only displays instructions, but provides feedback depicting the selected indicia superimposed upon a representation of the compact disc.

Microprocessor 48 communicates with the other components by cables 52. Power for operating motor 40 and motors (not shown) for moving carrier 28 and turning rollers 44 is also carried through cables 52. Motors not shown and associated motion translating and transmitting apparatus may be of any suitable type well known in the mechanical arts, and their precise nature is not critical.

Optionally, sticker dispenser 20, shown in FIG. 1, which may include a printer (not shown), or which may dispense preprinted labels, is connected to microprocessor 48 for printing and dispensing an adhesive backed label 50 which may be employed later. Label 50 may repeat the indicia marked upon the compact disc, and may include a warning that the enclosed compact disc is identified as to its owner.

It is to be understood that the present invention is not limited to the sole embodiment described above, but encompasses any and all embodiments within the scope of the following claims.

I claim:

1. A compact disc marking apparatus comprising:
   a marking device confined within the apparatus for marking indicia upon a flat synthetic, polymeric surface of a compact disc in a clear unrecorded portion on a front face thereof, including:
       a marking means for projecting energy selected from the group consisting of routing, hot stamping high voltage, high pressure fluid jets, and laser onto and modifying the polymeric surface, and
       a means for controlling the position of said projecting energy in three axes, thereby selectively focussing said energy onto the polymeric surface in forming a selected indicia;
   a data input device for accepting data corresponding to said selected indicia; and
   a programmable controller for accepting a data input from said data input device and transmitting corresponding commands to said marking device to form the selected indicia on said compact disc.

2. The compact disc marking apparatus according to claim 1, further comprising compact disc positioning means at an opening for accepting a compact disc from a person holding the disc, and moving the compact disc to a predetermined, fixed location proximate said marking apparatus, and returning the disc to said opening which is accessible to the person using said marking apparatus.

3. The compact disc marking apparatus according to claim 2, further comprising activation means for recognizing and accepting payment, and activating said marking apparatus responsive to successful acceptance of payment.

4. The compact disc marking apparatus according to claim 1, further comprising a manual data entry means selected from the group consisting of a keypad device, a touch type screen device, and a sound responsive device for enabling a user to input predetermined, selected indicia to said marking apparatus.

5. The compact disc marking apparatus according to claim 4, wherein the data input device comprises a keypad device.

6. The compact disc marking apparatus according to claim 4 wherein the data input device comprises a sound responsive device.

7. The compact disc marking apparatus according to claim 4, wherein the data input device comprises a touch type screen device.

8. The compact disc marking apparatus according to claim 7, wherein the touch type screen device is operated by pressing on a surface of said touch type screen device with a user's finger.

9. The compact disc marking apparatus according to claim 7, wherein the touch type screen device is operated by pressing on a surface of said touch type screen device with a stylus.

10. The marking apparatus according to claim 1, further comprising a label at a separate location from said opening dispenser for dispensing a label.

11. A method of marking indicia upon an unmarked compact disc in a compact work station usable by the public, comprising the steps of:
   providing a compact work station usable by the public;
   securing a compact disc at a fixed location of the compact work station;
   activating the compact work station by making a payment in recognizable form selected from the group consisting of coins, currency, credit cards, and debit cards to the compact enabling apparatus;
   entering data corresponding to predetermined indicia into a programmable controller by providing a device selected from the group consisting of a keypad device, a touch type screen device and a sound responsive device;
   translating the data to commands controlling an automated three-axis orthogonal marking apparatus; and
   marking the clear unrecorded portion of a front face of the compact disc with the predetermined indicia by manipulating the automated marking apparatus in three axes in response to the orthogonal control system by engraving a substantially permanent indicia on said clear unrecorded portion of the compact disc.

12. The method of marking a compact disc according to claim 11, wherein the user receives the indicia marked compact disc from the same fixed location as the unmarked compact disc was secured.

13. The method of marking a compact disc according to claim 11, wherein the indicia is selected from the group consisting of a gift message, a holiday greeting, a commercial message, a religious message, and a political message.

14. The method of marking a compact disc according to claim wherein the indicia is a name.

15. The method of marking a compact disc according to claim 11, wherein the indicia is selected from the group consisting of letters, symbols, and pictorial depictions.

16. The method of marking a compact disc according to claim 11, wherein the engraving is performed by an energy projecting device selected from the group consisting of a router, a hot stamper, a high voltage producer, high pressure fluid jets, and a laser.

17. The method of marking a compact disc according to claim 11, wherein the engraving is performed by a router.

18. The method of marking a compact disc according to claim 11, wherein a separate printer within the compact work station is provided to dispense adhesive backed pre-printed labels repeating the indicia marked upon the compact disc.

19. The method of marking a compact disc according to claim 11, wherein a separate printer within the compact work station is provided to dispense adhesive backed pre-printed labels including a warning that the marked compact disc is identified as to its owner.

20. A compact disc bearing indicia marked by the method of claim 11, comprising;
- a flat synthetic, polymeric surfaced compact disc having a clear unrecorded portion surrounding a post hole on a front face;
- said clear unrecorded portion bearing on its surface a substantially permanent indicia selected from the group consisting of a name, a gift message, a holiday greeting, a commercial message, a religious message, a political message, and mixtures thereof.

* * * * *